(12) United States Patent
Sich

(10) Patent No.: US 8,033,079 B2
(45) Date of Patent: Oct. 11, 2011

(54) METHOD OF MANUFACTURING TERRAZZO TILES, TERRAZZO TILES AND FLOORING SYSTEM ASSEMBLED WITH TERRAZZO TILES

(75) Inventor: John H Sich, Manchester, CT (US)

(73) Assignee: FloorazzoTile, LLC, Siler City, NC (US)

( * ) Notice: Subject to any disclaimer, the term of this patent is extended or adjusted under 35 U.S.C. 154(b) by 715 days.

(21) Appl. No.: 12/059,531

(22) Filed: Mar. 31, 2008

(65) Prior Publication Data

US 2008/0236092 A1    Oct. 2, 2008

Related U.S. Application Data

(60) Provisional application No. 60/920,667, filed on Mar. 29, 2007.

(51) Int. Cl.
*B28B 11/24* (2006.01)
*E04G 21/00* (2006.01)

(52) U.S. Cl. ............... 52/745.19; 52/747.11; 52/747.12; 52/612; 52/390; 52/391; 428/41.6; 264/162; 264/108

(58) Field of Classification Search ............ 52/384–389, 52/390–392, 506.06, 782.1, 783.1, 796.1, 52/746.12, 747.1, 747.12, 741.1, 745.19, 52/747.11, 749.1; 264/131, 162, 108, 138–139, 264/256, 293, 31; 428/42.1, 41.6
See application file for complete search history.

(56) References Cited

U.S. PATENT DOCUMENTS

| | | | |
|---|---|---|---|
| 1,619,734 A | 3/1927 | Jeppson | |
| 1,949,517 A | 3/1934 | Van Der Pyl | |
| 2,004,015 A * | 6/1935 | Scott | 222/96 |
| 2,787,871 A | 4/1957 | Le Clercq | |
| 2,925,691 A | 2/1960 | Kibble | |
| 3,242,242 A | 3/1966 | Bournique | |
| 3,247,299 A | 4/1966 | Zaha | |
| 3,278,662 A | 10/1966 | Mangrum | |
| 3,303,245 A | 2/1967 | Trudeau | |
| 3,305,506 A | 2/1967 | Murray | |
| 3,344,011 A | 9/1967 | Goozner | |
| 3,378,617 A * | 4/1968 | Elmendorf | 264/162 |
| 3,512,460 A * | 5/1970 | Surine et al. | 264/69 |

(Continued)

FOREIGN PATENT DOCUMENTS

CN    1146437    4/1997

(Continued)

OTHER PUBLICATIONS

779430 B, ITX, Montecatini Spa.

(Continued)

*Primary Examiner* — Jeanette E. Chapman
(74) *Attorney, Agent, or Firm* — Ward and Smith, P.A.

(57) ABSTRACT

A method of manufacturing terrazzo tiles and tiles manufactured in accordance with the method is described. A resin, curing agent, filler, and pigment are poured into a mold. Stone chips are then poured into the mold to settle with the majority at the bottom of the mold. Thereafter, curing occurs to result in rough tiles which are ground and then polished with the upper surface being the resulting tile surface at which the majority of the stones settle. The tiles are assembled onto a floor with grout lines resulting from spacing of the tiles, one from another. Grout is then poured in and skived, and the floor polished to result in a sealed monolithic surface.

9 Claims, 2 Drawing Sheets

U.S. PATENT DOCUMENTS

| | | | | |
|---|---|---|---|---|
| 3,552,908 A | * | 1/1971 | Boiardi | 427/204 |
| 3,827,204 A | * | 8/1974 | Walters | 52/396.04 |
| 3,969,851 A | * | 7/1976 | Whitacre | 52/98 |
| 4,085,181 A | | 4/1978 | Cosentino | |
| 4,093,690 A | * | 6/1978 | Murray | 264/82 |
| 4,260,699 A | | 4/1981 | Plaisted | |
| 4,546,024 A | * | 10/1985 | Brown | 428/44 |
| 4,790,110 A | * | 12/1988 | Bard | 52/173.1 |
| 5,085,008 A | | 2/1992 | Jennings | |
| 5,111,627 A | * | 5/1992 | Brown | 52/126.5 |
| 5,255,482 A | * | 10/1993 | Whitacre | 52/390 |
| 5,551,960 A | * | 9/1996 | Christianson | 51/295 |
| 5,902,411 A | * | 5/1999 | Williams et al. | 134/3 |
| 5,927,034 A | * | 7/1999 | Cole | 52/391 |
| 5,993,116 A | | 11/1999 | Paxton | |
| 6,247,195 B1 | * | 6/2001 | O'Brien et al. | 4/663 |
| 6,350,501 B1 | | 2/2002 | Guariento | |
| 6,355,191 B1 | | 3/2002 | Toncelli | |
| 7,591,967 B2 | * | 9/2009 | Palermo et al. | 264/34 |
| 7,700,017 B2 | * | 4/2010 | McCarthy et al. | 264/71 |
| 2001/0002412 A1 | | 5/2001 | Kolarik | |
| 2002/0143093 A1 | | 10/2002 | Kolarik | |
| 2005/0065260 A9 | | 3/2005 | Kolarik | |
| 2005/0107017 A1 | | 5/2005 | Fioratti | |
| 2006/0260243 A1 | | 11/2006 | Angelozzi | |
| 2008/0172963 A1 | * | 7/2008 | Harrison | 52/287.1 |

FOREIGN PATENT DOCUMENTS

| | | | |
|---|---|---|---|
| DE | 3637585 A1 | * | 5/1987 |
| GB | 1404934 | | 9/1975 |
| GB | 2266103 A | * | 10/1993 |
| JP | 2005320198 A | | 11/2005 |

OTHER PUBLICATIONS

Santa Regina Engineered Terrazzo Brochure.
Rover Precast Terrazzo Tile Brochure.
Fritz Tile Resilient Terrazzo Tile Instructions.
Pilkington's Terrazzo Tile Brochure.

* cited by examiner

METHOD OF MANUFACTURING TERRAZZO TILES, TERRAZZO TILES AND FLOORING SYSTEM ASSEMBLED WITH TERRAZZO TILES

CROSS-REFERENCE TO RELATED APPLICATIONS

This application is related to U.S. Provisional Application Ser. No. 60/920,667 filed Mar. 29, 2007 of the same inventor and entitled Method of Manufacturing Terrazzo Tiles, Terrazzo Tiles and Flooring System Assembled with Terrazzo Tiles, the disclosure of which is specifically incorporated in its entirety by reference herein. Applicant hereby expressly claims priority to the filing date of said U.S. Provisional Application Ser. No. 60/920,667.

BACKGROUND OF THE INVENTION

1. Field of the Invention

This invention relates to a method of manufacturing resin (terrazzo) tiles which are polished to a smooth surface, and to tiles made in that manner. More specifically, the invention also relates to a flooring system using such tiles which will add an appearance and functionality similar to poured in place terrazzo floors.

2. Discussion of Existing Systems

In the past, for most commercial applications, the flooring of choice is what is known as a terrazzo floor. Such floors typically are monolithic floors, i.e., a single surface with no breaks, which are poured in place over a substrate floor surface such as a concrete surface. The manufacture of such floors is well known and dates back for decades.

Typically, in the manufacture of such floors, a concrete surface is prepared and smoothed and then a resin and stone chips are mixed in with a curing agent. The resultant mixture is poured over the entire concrete subsurface. Skilled craftsmen then work the poured surface, much as skilled craftsmen work poured concrete floors in order to ensure a smooth, flat, and uniform surface for the poured terrazzo floor. Thereafter, the floor is allowed to cure and prepared for use. One desirable aspect of terrazzo floors is that the designer can obtain exactly the color desired by selection of an appropriate coloring agent or dye (pigment), and the poured in place floor is "monolithic," i.e., does not have separate and discontinuous sealing inherent between tiles in a tile system.

A problem with poured in place floors, however, is that it is labor intensive and requires highly skilled craftsmen. The poured in place floors hinders adjacent construction and prolongs clean up from the floor finishing process. More specifically, while smoothing of poured concrete is a relatively simple task because the surface need not be particularly smooth, this is not the case with poured in place floors because they are generally used in high human traffic areas and are required to provide an aesthetically pleasing environment. Thus, the skill level of craftsmen working on poured in place floors needs to be very high, and the process is labor intensive, thereby resulting in a relatively high cost.

Past attempts to replace poured in place floors with tile systems have resulted in numerous attempts to manufacture terrazzo floor tile, but all resulted in thick and uneven tiles, and there was no way to provide a monolithic surface with such tiles as is possible with poured in place floors.

Accordingly, the problems of the prior art described with poured in place floors and the attempted substitute with terrazzo tiles are avoided in accordance with the invention which is described in greater detail further herein.

BRIEF SUMMARY OF THE INVENTION

In accordance with the invention, in one aspect, there is provided a method of manufacturing terrazzo tiles for assembly into a floor, having characteristics similar to poured in place terrazzo floors. The method includes the steps of mixing a resin, filler, catalyst and a selected color dye or pigment in an amount sufficient to form a curable composition. The curable composition is poured into a mold, or a plurality of molds, in an amount sufficient to allow adding of stone chips, in an amount of such that the mold does not overflow. Stone chips are then poured into the mold so as to have a greater amount of stone chips settle toward the bottom of the mold in the composition than toward the top, to thereby form a composition and stone chip mixture therein. The composition and stone chip mixture is cured to form a rough tile. The tile is then ground and polished to result in a polished tile in which the upper surface of the tile is the side toward which the greater amount of stone chips settled. Typically, the composition is made up of five components. A first component is a flexible polyester resin. Other components include coarse calcium carbonate filler and fine calcium carbonate filler. A pigment or dye is added for color and a catalyst is added as a hardener.

These components are mixed and poured into the mold, and the stone chips, typically marble chips, are then poured into the mold.

In the case of preparing a grout for pouring into grout lines between assembled tiles on a flooring system, the flexible polyester resin, course calcium carbonate filler, fine calcium carbonate filler and pigment are mixed at a factory and shipped to the job site. The catalyst is then added and the grout injected into grout lines with a caulking gun.

In a more specific aspect, the molds are no more than ¼ inch deep. Preferably, the tiles are polished by being conveyed on a conveyer means having sidewalls to limit side to side movement of the tiles to ensure the entire top surface is polished. Polishing bricks of sequentially finer grade are arranged in sequence to polish the tiles, with all bricks bearing on each tile at all times during polishing to allow polishing of tiles of a depth of as small as about ⅛ inch without damage thereto. The constant contact avoids "buckling."

In another aspect, the invention is related to terrazzo tiles made according to the method described herein.

In a still further aspect, the invention relates to a terrazzo floor system. The floor system includes a plurality of tiles manufactured according to the method described herein and assembled to both a solid floor subsurface or surface and a wall subsurface or surface, and spaced sufficiently from each other to define grout lines. A floor to wall transition member having a vertical extension and a horizontal extension is provided with the vertical extension and the horizontal extension connected by a curved transition section. The transition member is made flexible and of the same cured resin matrix as that of the tiles, but "tweaked" to be more flexible than the tiles. The transition member is adhered to a wall surface and floor surface in a manner defining a grout line between tiles adhered to the floor surface and the horizontal extension thereof, and tiles adhered to the wall surface and the vertical extension thereof. Each grout line is filled with a cured resin which is the same as the cured resin matrix of the tiles in a manner flush with the tiles and with the vertical and horizontal extensions of the transition member to result in a floor to wall tile system which is sealed against penetration by materials spilled thereon.

In a more specific aspect, the vertical extension and horizontal extension of the transition member are both of the same depth as the tiles to be coextensive therewith.

BRIEF DESCRIPTION OF SEVERAL VIEWS OF THE DRAWINGS

Having thus briefly described the invention, the same will become better understood from the following detailed discussion, made with reference to the appended drawing in which.

DETAILED DISCUSSION OF THE INVENTION

Figure 1:
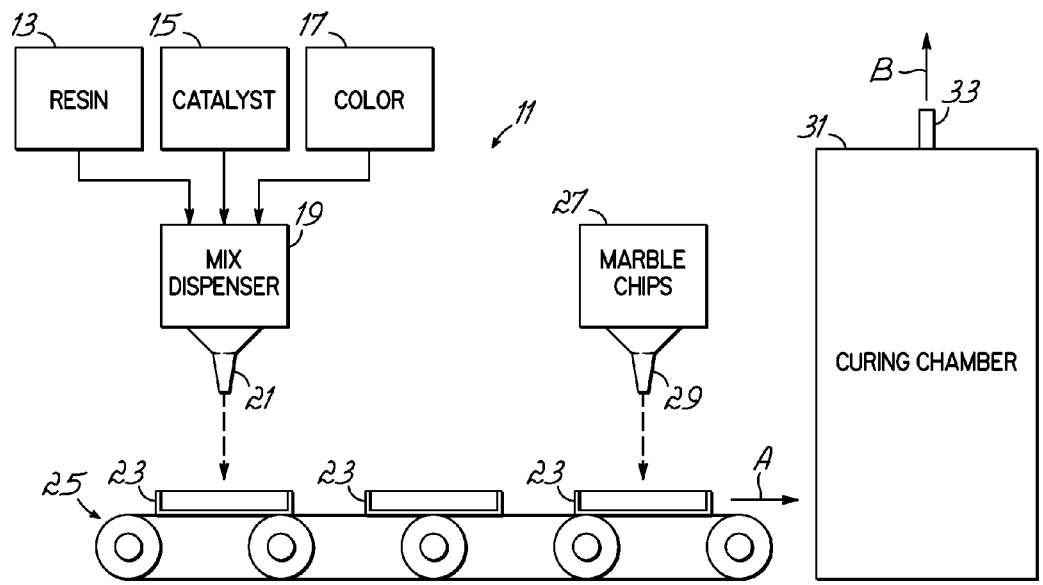
FIG. 1 is a schematic diagram showing how the components for making tiles are mixed and poured into molds, and cured to result in rough tiles used in the manufacturing polished tiles in accordance with the invention.

In accordance with the invention there is provided a new flooring system that combines the best features of competing floor systems. More specifically, the floor system in accordance with the invention provides the advantages of a tile system combined with the advantages of a poured in place terrazzo system. Previously, it was also known to manufacture terrazzo tiles, but the processes were inconsistent, and then the resulting product could not provide the flexibility in terms of surface quality, as well as color selection that poured in place tiles provided. In accordance with the invention there is provided a method of manufacturing terrazzo tiles, tiles manufactured in accordance with the method, and flooring systems assembled with such tiles which provides a monolithic flooring system and wall system which is sealed and prevents penetration through the floor and wall system into the underlying surfaces by materials spilled on the tiles on the floor and wall. In addition, the expense of having skilled craftsmen and the required transport of large amounts of materials to the work site to assemble a poured in place floor is avoided. Tile terrazzo tiles have never completely replaced poured in place floors for two fundamental reasons. With poured in place floors, the designer can obtain exactly the colors they want, and a poured in place floor is monolithic.

In accordance with the invention, terrazzo tiles can be manufactured in a mass produced manner and later assembled into a monolithic floor/wall system with the color desired by the designer. More specifically, the tiles in accordance with the invention are typically standard 2 foot by 2 foot or 2 foot by 4 foot tiles, which are assembled at a factory and shipped to a job site. The tiles are installed on a floor using standard adhesives by local flooring contractors that normally install vinyl tile. During installation, the tiles are spaced for about a $1/16$ inch to about a $1/32$ inch grout line. Thereafter, the tiles are rolled and the adhesive hardened. The grout lines are overfilled with exactly the same resin compound that is used to bind stone chips, typically marble chips, into a tile. During assembly, as the grout starts to harden, the overfill is "skived" or cut off the top of the tile with a sharp scraping knife. An alternative to an overflow arrangement is the overflow controlled arrangement of FIG. 5(b) which shows a dam construction which can be used to standardize the shape and amount of overflow occurring.

When a system in accordance with the invention is assembled, it can provide a highly sanitary floor that is watertight up the wall to a height of at least six inches to several feet. Such a system is particularly useful in operating room applications in which a constant problem is foreign substances penetrating through the existing flooring system into the sheet rock and studs making up the room, and resulting in cultivation of bacteria and other harmful organisms thereby resulting in an unsafe operating room environment.

Having thus generally described the invention, the following discussion is made with reference to the drawings.

In FIG. 1, a mixing system 11 includes a resin dispenser 13, catalyst dispenser 15, and pigment or dye dispenser 17, which are arranged to feed the components thereof in a predetermined amount well known to those of ordinary skill in the art into a mixer and mix dispenser 19. This mixing system 11 also includes a conveyer system 25 having molds 23 passed underneath the mix dispenser 19 from which the resulting composition is poured through a funnel 21 into molds 23. As will become more readily apparent, it is important that these molds be no more than about ¼ inch in depth and the amount of composition dispensed thereinto is such as to allow sufficient marble chips to be dispensed later so that the mold does not overflow.

Thereafter, a stone chip dispenser 27, typically for dispensing marble chips, is arranged for pouring marble chips through a chute 29 into the mold 23 which is filled with the composition. The stone chips are dispersed uniformly over the composition surface. As a result of a uniform dispersal of stone chips from the chute 29, a greater amount of stone chips settle in the composition towards the bottom of the mold 23 at what will eventually be the top surface of the tile, than at the upper portion of the composition. Thereafter, the molds 23 with the composition and marble chip mixture therein are passed as shown by arrow A into a curing chamber 31 which is heated. As curing occurs, a vent 33 allows noxious gases to be exhausted to atmosphere or other appropriate controlled area as shown by arrow B.

Figure 2:
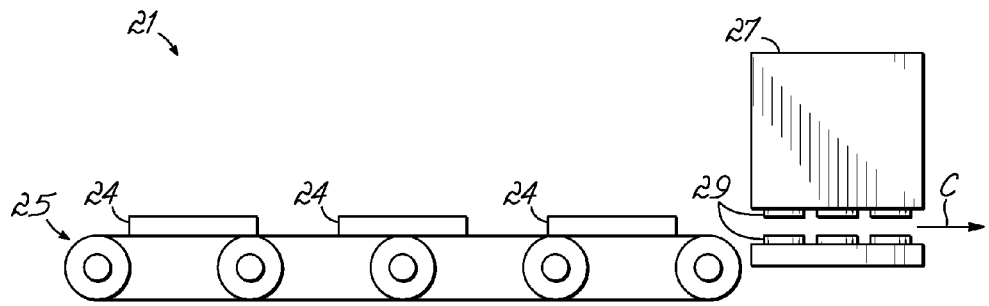
FIG. 2 is a schematic diagram showing how rough tiles in accordance with the invention are ground on both sides.

As shown in FIG. 2, after the resultant tiles 24 are cured, they are very rough on both surfaces and are passed to a grinding station 21 in which the tiles 24 are passed by a conveyer system 25 to grinder 27 having grinding elements 29 for engagement of the tiles 24 on both surfaces thereof. The tiles 24 exit as shown by arrow C to be passed to a polishing station 32.

Figure 3:
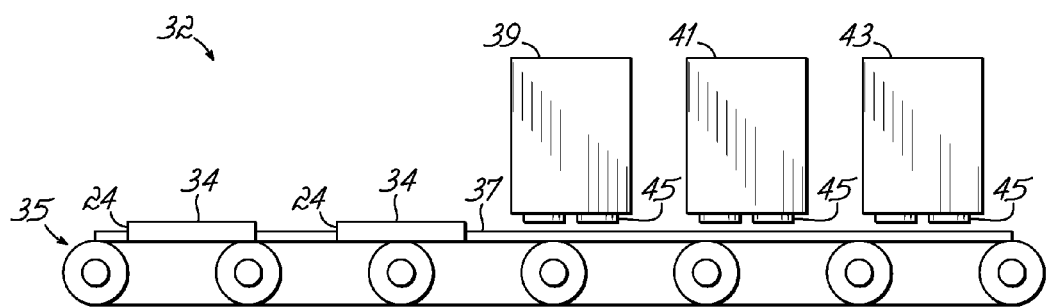
FIG. 3 illustrates a method and polishing system for the rough ground tiles resulting from the method and system of FIG. 2.
Figure 4:
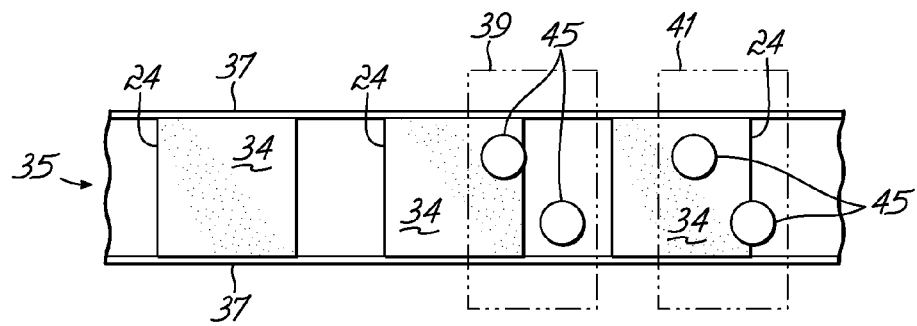
FIG. 4 is a greater detail view from the top of FIG. 3 showing two sequential polishing stations, shown partially in phantom, illustrating how polishing is conducted on the tiles manufactured by the method.

As shown in FIG. 3, the tiles 24, which have now been ground, are placed on a conveyer assembly 35 with the top surface 34 facing upward. This top surface 34 is what originally appeared to be the bottom surface and is the area wherein most or the greater amount, of the stone chips settled when the stone chips were poured into the resin composition. A series of polishing stations 39, 41, and 43 with increasingly finer polishing bricks 45 are assembled to polish the top surface 34 of the tiles 23. The conveyer assembly 35 also includes a side edge 37 which is raised to prevent the tiles from slipping side to side as shown, with only two polishing stations 39 and 41 shown in FIG. 4.

The tiles 24 are conveyed to be polished by polishing bricks 45, and as may be appreciated, side edges 37 prevent the tiles 24 from moving from side to side. The polishing bricks 45 which also function as hold down devices 45 are arranged from station to station so as to always be in contact with the tiles 24 and the upper surface 34 thereof. As a result, each tile 24 transitions, for example, from polishing station 39 to polishing station 41, in a manner engaged by the polishing brick/ hold down devices 45 of a first polishing station 39, and then simultaneously during the transition, engaged by the hold down devices 45 of polishing station 41, so that a set of polishing bricks/hold down devices is always in contact with the tile 24 during the polishing operation. This continuous contact with the polishing brick/hold down devices 45 is critical because it allows manufacture of tiles of thinness in depth previously thought not possible. There is also a pneumatic back pressure regulator to decrease the polishing head/hold down-device weight that is exerted onto the tile surface.

More specifically, in accordance with the system and polishing method of the invention, tiles can be made of a thickness of about 1/16 inch to about 1/8 of an inch. Further, by depositing the stone chips in a manner described, only the exposed surface of the tiles when assembled as a floor shows a predominance of stone chips. If polishing is not done in accordance with the method described herein, conventionally manufactured terrazzo tiles tend to buckle and break and need to be made substantially thicker. Thus, by providing a system and method which allows manufacture of tiles of a thickness previously unheard of, substantial amounts of materials can be saved resulting in significantly lower costs to the installer and end user.

Figure 5A:
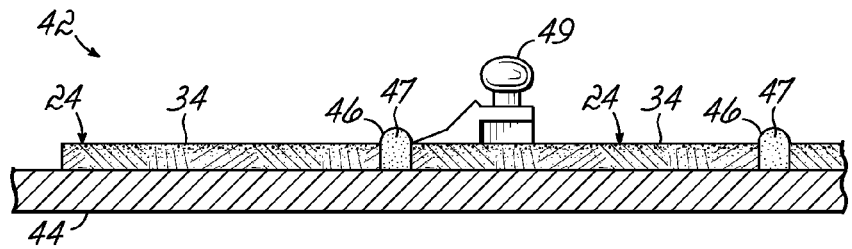
FIGS. 5A and 5B illustrate in partial side cross section views two alternative embodiments of how tiles are adhered to a flooring subsurface, with grout applied thereon, and showing how the grout is made flush with the tile surface.

FIG. 5A illustrates how the floors in accordance with the invention are assembled. The tiles 24 are adhered to a floor subsurface 44, with the top surface 34 of each tile having the greatest amount of stones facing upwards. This is the polished surface. In one embodiment of a flooring system 42, grout 46 is poured into grout lines which are typically about 1/16 inch to about 1/32 inch in width. The grout 45 is poured in a manner that a top portion 47 extends above the tile surface 34. A skiving tool 49, is used before the grout fully cures to cut off the upper portion 47. Thereafter, a final polishing of the entire floor surface is conducted to result in a monolithic surface.

Figure 5B:
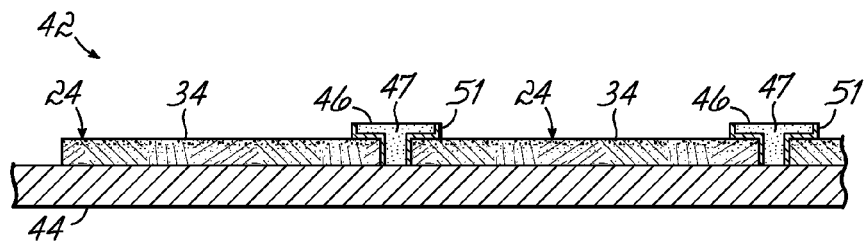

In an alternative embodiment as shown in FIG. 5B, paper or cardboard dams 51 are assembled so that the overflow of grout results in an upper portion 47 of uniform size which can be simply broken off. Thereafter final polishing is conducted as before.

Figure 6A:
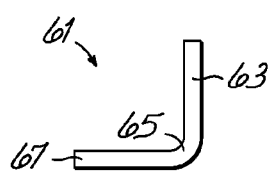
FIGS. 6A and 6B illustrate in side and front views respectively the floor to wall transition member.
Figure 6B:
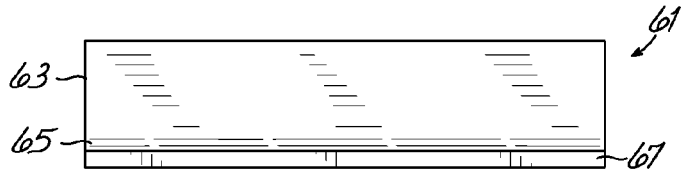

In order to provide a sealed tile and floor system in accordance with the invention, a floor to wall transition member 61 can be manufactured. The transition member 61 can be manufactured in a conventional mold of the same resin as the tiles, but without stones, and includes a vertical extension 63 and a horizontal extension 67, with a curved transition region 65 to transition between wall and floor. This is shown in FIGS. 6A and 6B.

Figure 7:
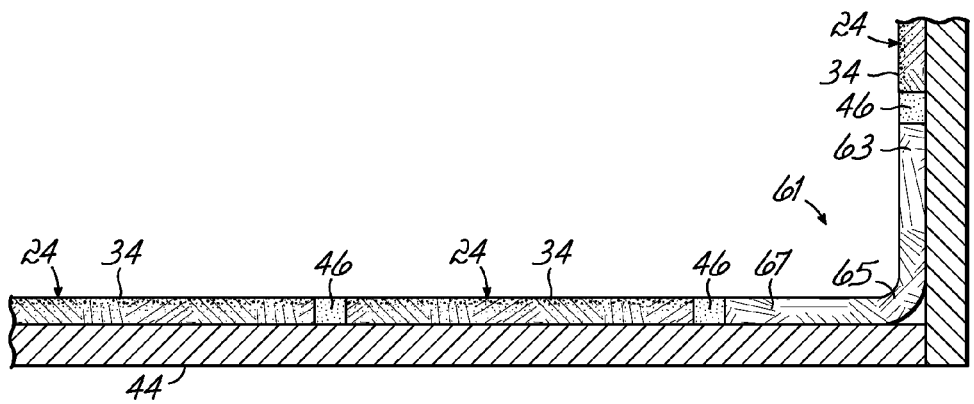
FIG. 7 illustrates a floor and wall system in accordance with the invention showing the corner transition between floor and wall with the floor to wall transition member shown assembled with the tiles.

As further shown in FIG. 7, the transition member 61 is assembled in contact with the wall and floor subsurface. The tiles are then adhered to the wall and floor subsurface as shown in FIG. 7 with spacing for grout 46, and the grout can be added as previously described. The composition of the transition member 61 is "tweaked" in a manner well known to result in a transition member 61 which is flexible as compared to the tiles 24.

Having thus generally described the invention, the same will become better understood from the appended drawings in which are set forth in a non limiting manner.

What is claimed is:

1. A terrazzo tile made according to a method, the method comprising:
    mixing resin, filler, catalyst and selected color pigment in an amount sufficient to form a curable composition;
    pouring said curable composition into at least one mold in an amount sufficient to fill the mold while allowing space to add stone chips in an amount such that the mold does not overflow when stone chips are added;
    pouring stone chips into said at least one mold in a manner to have a greater amount of stone chips settle toward the bottom of the mold in the composition than toward the top, thereby forming a composition and stone chip mixture therein;
    curing the composition and stone chip mixture to form at least one rough tile; and
    grinding and polishing the at least one rough tile to result in a polished tile in which the upper surface of the tile is the side toward which the greater amount of stone chips settled.

2. A terrazzo tile according to claim 1 wherein said mold is no more than about 1/4 inch deep to thereby result in a tile which is no more than about 1/16 to about 1/8 inch deep.

3. A terrazzo tile according to claim 2 wherein said mold is about 25 inches in width by about 50 inches (plus) in length.

4. A terrazzo tile according to claim 2, wherein at least one said tile is polished by being conveyed on a conveyer having side walls to limit side to side movement of the at least one tile to ensure the entire top surface of the tile is polished, and by having polishing bricks of sequentially finer grade polish the tile in sequence with at least one set of hold downs bearing on the tile at all times during polishing to allow polishing of tiles of a depth of as small as about 1/8 inch to be polished without damage thereto.

5. A terrazzo floor system, comprising:
    a plurality of tiles adhered to a solid floor surface, and spaced a sufficient amount from each other to define a grout line, each one of said tiles comprised of a cured resin matrix wherein a greater amount of stone chips are dispersed toward a top surface of each tile than a bottom surface thereof;
    a floor to wall transition member having a vertical extension and a horizontal extension, with said vertical extension and said horizontal extension connected by a curved transition section, and with said transition member being made flexible and of the same cured resin matrix of said tiles, and said transition member being adhered to a floor surface and a wall surface in a manner defining a grout line between tiles adhered to the floor surface and the horizontal extension thereof and tiles adhered to the wall surface and the vertical extension thereof; and
    each grout line being filled with a cured resin which is the same as the cured resin matrix of the tile in a manner flush with the tiles and with the vertical and horizontal extensions of said transition member to result in a floor to wall tile system which is sealed against penetration by materials spilled thereon.

6. The floor system of claim 5, wherein said stone chips are marble chips.

7. The floor system of claim 5, wherein said tiles are no greater than about 1/4 inch to about 1/8 inch deep.

8. The floor system of claim 5 wherein said cured resin matrix is made from a cured composition wherein a resin thereof is one of polyester resin, LB 1157-30, a filler thereof is course calcium carbonate, fine calcium carbonate, 40/200 & #10, a catalyst thereof is HI-Point 90, and a pigment which is CF-00000.

9. The floor system of claim 5, wherein said vertical extension and said horizontal extension of said transition member are of the same depth as the tiles.

\* \* \* \* \*